Dec. 19, 1933.  F. C. WILSON  1,940,382
ADJUSTABLE SEALING STRIP FOR DOORS
Filed May 24, 1930  2 Sheets-Sheet 1
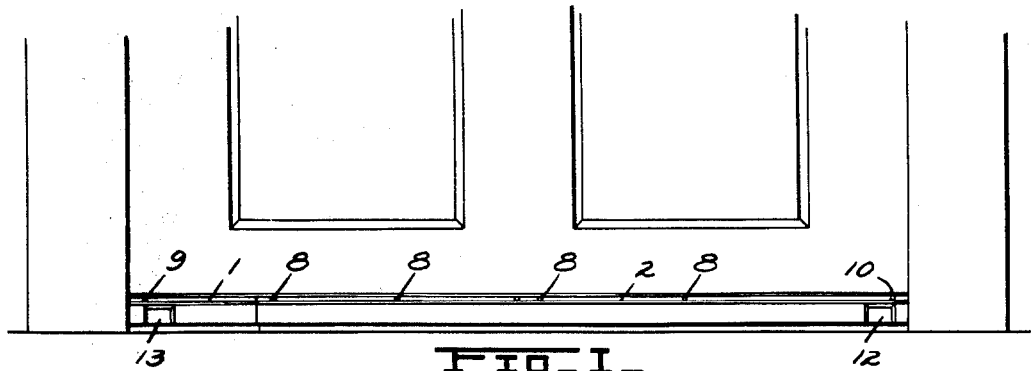
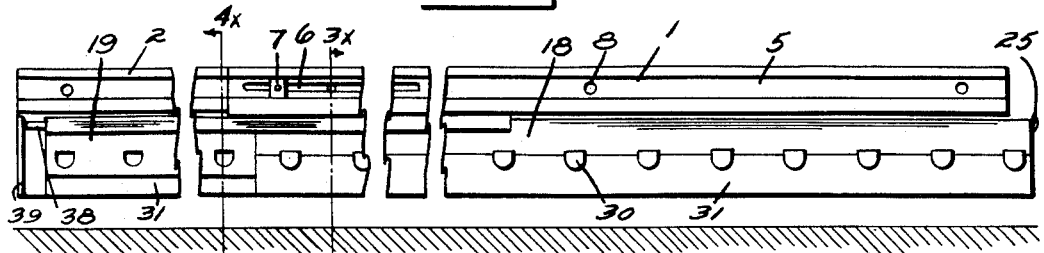
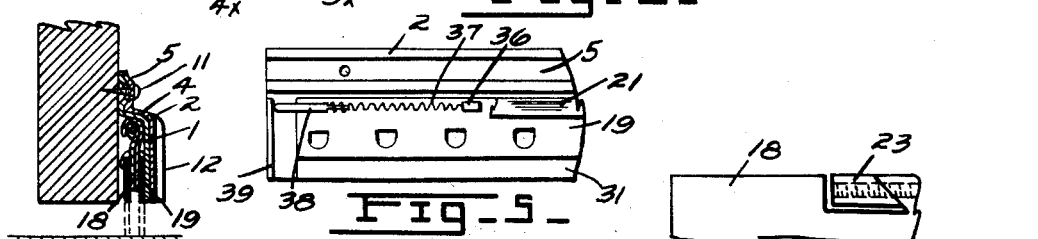
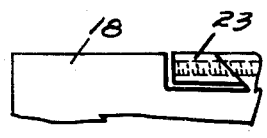
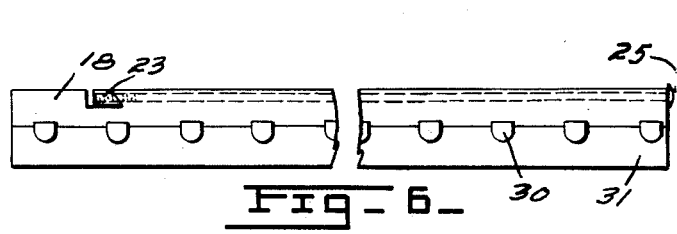
Inventor
FRED C. WILSON
By Frank Keifer
Attorney Dec. 19, 1933.         F. C. WILSON         1,940,382
ADJUSTABLE SEALING STRIP FOR DOORS
Filed May 24, 1930         2 Sheets-Sheet 2
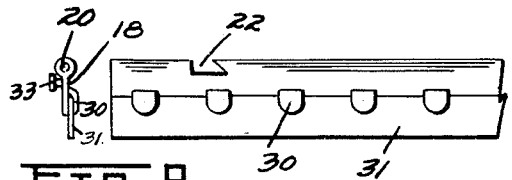
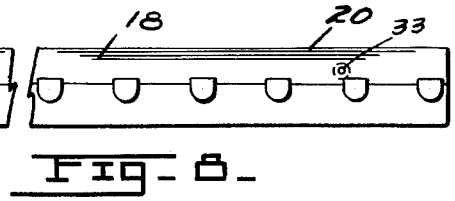
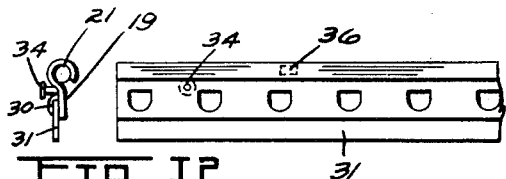
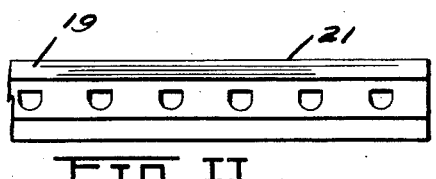
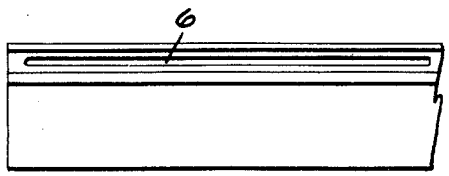
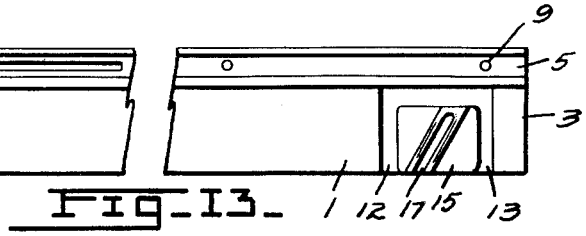
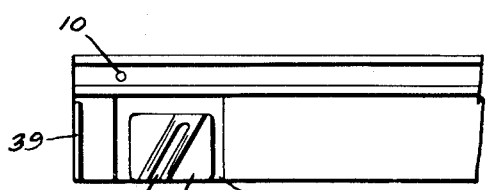
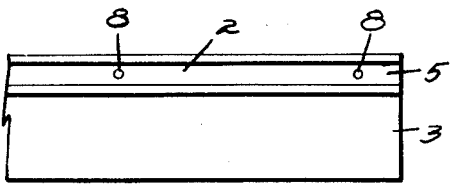
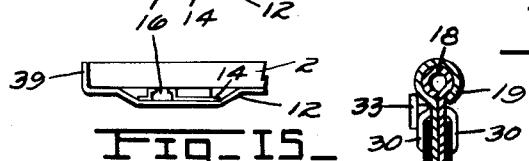
Inventor
FRED C. WILSON
By Frank Keifer
Attorney Patented Dec. 19, 1933

1,940,382

UNITED STATES PATENT OFFICE 1,940,382

ADJUSTABLE SEALING STRIP FOR DOORS

Fred C. Wilson, deceased, late of Rochester, N. Y., by Belle E. Wilson, administratrix, Rochester, N. Y.

Application May 24, 1930. Serial No. 455,329

7 Claims. (Cl. 20—68)

The object of this invention is to provide a new and improved adjustable and self adjusting weather strip for doors.

This and other objects of the invention will be fully illustrated in the drawings, described in the specification and pointed out in the claims at the end thereof.

In the drawings:

Figure 1 shows the bottom of a closed door with my improved strip in place thereon, the hinge style being on the right and the lock style on the left.

Figure 2 is an enlarged rear elevation of the weather strip shown in Figure 1.

Figure 3 is a vertical section on the line 3x, 3x of Fig. 2.

Figure 4 is a vertical section on the line 4x, 4x of Fig. 2.

Figure 5 is a detail view of the left hand end of Figure 2, with the housing of the spring broken away.

Figure 6 is a detail view of the male moving bar partly broken away.

Figure 7 is an enlarged detail view of a portion of the bar shown in Figure 6 showing the locking dog.

Figure 8 is a detail view of the bar shown in Figure 6 with the locking dog omitted.

Figure 9 is an end elevation of the bar shown in Figure 8.

Figure 10 is a detail view of the locking dog and the threaded rod for operating it shown in Figure 6 and omitted from Figure 8.

Figure 11 is a detail view of the female moving bar.

Figure 12 is an end elevation of the bar shown in Fig. 11.

Figure 13 is a detail view of one of the stationary Z bars.

Figure 14 is a detail view of the other stationary Z bar. Figs. 13 and 14 both show the side that is placed toward the door.

Figure 15 is a bottom plan view of the left hand end of the stationary bar shown in Figure 14.

Figure 16 is an enlarged vertical section through the moving bars assembled.

In the drawings like reference numerals indicate like parts.

In the drawings reference numeral 1 indicates the inner stationary Z bar shown at the left in Figure 3 and in Figure 13, and reference numeral 2 indicates the outer stationary Z bar shown at the right in Figure 3 and in Figure 14. Each of these bars is bent to a Z shape having an upright section 3 at the bottom, a horizontal section 4 intermediate and a channel shaped section 5 at the top. In the channel shaped section 5 of the bar 1 is formed a slot 6 which is engaged by a bolt and nut 7 as is shown in Figure 2. This bolt passes through any one of the openings 8, 8 in the bar 2 as may be needed or convenient in adjusting the stationary members to the proper length, and by this bolt and nut the two stationary Z bars are locked together after being moved so as to secure between them any desired length that may be needed to correspond to the width of the door to which they are to be applied. At the right hand end of the stationary bar 1 shown in Fig. 13 a screw hole 9 is provided and at the left hand end of the stationary bar 2 shown in Fig. 14 a screw hole 10 is provided through which screw holes the screws 11 pass for the purpose of fastening the door seal to the bottom of the door. Intermediate screw holes are provided in each strip one or more of which will be uncovered in the adjusting of the strips lengthwise on each other so that one or more screws may be used between the ends for the purpose of fastening the assembly to the bottom of the door.

At the bottom of the stationary Z bar 2 is formed an enlargement or bay 12 as shown in Figure 15, and at the bottom of the stationary bar 3 a similar enlargement or bay 13 is formed. In each of these bays a cam plate 14 and 15 is placed each plate having a cam guide slot 16, 17 thereon. As shown in Figure 15 the members or guides of this cam slot will be wholly contained within the bay or recess 12 and 13.

Mounted on the stationary Z bars 2 and 3 are provided the moving bars 18 and 19. These bars are intended to lie side by side as shown in section in Figure 3 and are adjustable lengthwise on each other by means that will presently be described so that the combination of the two bars can be adjusted to any length that may be desired to correspond to the width of the door. These moving bars are made each substantially a duplicate of the other in some respects. The upper edge of each bar is bent over to form a tube which runs the whole length of the bar. The tube on the upper edge of the bar 18 is of small diameter and the tube on the upper edge of the bar 19 is of larger diameter and is adapted to receive in it the small tube formed on the upper edge of the bar 18. These tubes make a free sliding fit on each other, and the large tube acts as a guide for the small tube. The large tube is open at the bottom for all of its length to the right of the stop 36. This gives clearance for the bar 18 as it slides on the bar 19. The small tube 20 on the upper edge of the bar 18 is cut away as indicated at 22 to receive therein the wedge shaped dog 23. This dog is tubular and is of substantially the same diameter as the tube 20 formed on the upper edge of the bar 18. It is threaded inside with a female thread to receive the male thread on the end of the rod 24. This rod has a head 25 on the outer end thereof and this rod extends through the small tube 20 and engages the dog 23 and as the rod is turned it makes threaded engagement with the dog and pulls the dog to the right as shown in Figure 6, and 10. The dog normally rests in line or concentric with the small tube 20, but as the rod 24 is turned, the dog 23 is drawn to the right and the dog moves down and out of line with the tube 20 and stands eccentric to it. This causes the small tube 20 and the dog 23 between them to grip on the inside of the large tube 21 locking the one tube to the other in whatever position they happen to be when the dog 23 is drawn to the right by the rod 24. This securely clamps the two moving bars together after they have been adjusted lengthwise on each other to the correct length.

Each bar has a series of lugs 30 struck up therein and between these lugs and the bar is inserted the rubber strip 31. The lugs are then bent down on the strip securely clamping the rubber strip between the lugs and the bar. The lower edge of the rubber strip on each bar extends some distance below the lower edge of the bar itself and is adapted to make flush contact with the floor when the moving bars are in their lowest position.

Each of these bars is provided with a stud, the stud 33 being placed at one end of the bar 18 and the stud 34 being placed at the other end of the bar 19. The heads and stems of these studs engage in the cam slots 16 and 17 and as the bar moves back and forth, the reaction of these studs on the cam slots causes the bars to move up and down.

Near the left hand end of the large tube 21 formed on the bar 19 is inserted a plug or stop 36. The tube is somewhat choked to the left of this plug or stop and the stop itself is brazed fast in the tube so as to fasten it rigidly in place therein. In the tube 21 to the left of this plug is inserted a compression spring 37, the left hand end of which presses against a plunger 38 which is adapted to move in or out of the left hand end of the tube 21. This plunger rests against the upturned end 39 of the stationary Z bar 2, and the reaction of the spring and plunger against the upturned end 39 causes moving bars 18 and 19 to move to the right along the cam slot 16 and 17 which cause them to move up or raise from the floor when the door is opened. The right hand end of the bar 18 will strike against the door jamb on the hinge side of the door as the door closes, or on a metal plate carried on the jamb, and will be moved to the left thereby carrying with it the bar 19 which is clamped to it by the dog 23, and as they move to the left on the closing of the door, these bars also move down and make contact with the floor. In so doing the tube 21 is forced over the plunger 38 compressing the spring 37. When the door is opened, the spring 38 expands causing the bars 18 and 19 to move to the right, and in so doing they travel up along the cam slots 16 and 17 and are thereby lifted from the floor.

It will thus be seen that both the stationary Z bars 1 and 2 and the moving bars 18 and 19 can be adjusted lengthwise to secure any desired length that may be needed to fit the width of the door, and after the assembly has been fastened in place on the door, the bars 18 and 19 will move together moving down to the floor when the door closes and moving up and away from the floor when the door opens.

I claim:

1. A weather strip adapted to be placed at the bottom of a door comprising a stationary horizontal bar adapted to be mounted on the bottom of a door, said bar being made in two sections overlapping each other and adjustable lengthwise on each other, and capable of being clamped together in any adjustable position, one of said sections having a long horizontal slot therein, the other section having a series of round holes therein placed on a level with said slot, a bolt passing through one of said holes and through said slot and clamping the two sections together in any desired position along said slot.

2. A weather strip adapted to be placed at the bottom of a door comprising a stationary horizontal bar adapted to be mounted on the bottom of a door, said bar being made in two sections overlapping each other and adjustable lengthwise on each other, and capable of being clamped together in any adjustable position, one of said sections having a long horizontal slot therein, the other section having a series of round holes therein placed on a level with said slot, a bolt passing through one of said holes and through said slot and clamping the two sections together in any desired position along said slot, said holes being spaced apart by distances less than the length of said slot.

3. A weather strip adapted to be placed at the bottom of a door comprising a stationary horizontal bar and a moving horizontal bar mounted on the stationary bar, said moving bar being composed of two sections overlapping each other and capable of being adjusted lengthwise one on the other, and capable of being rigidly fastened together in any adjusted position, one of said moving bars having a tube of small diameter formed on the upper edge thereof and the other of said moving bars having a tube of larger diameter formed on the upper edge thereof that is adapted to receive in it the tube of small diameter, said bars with their tubes being adapted to slide one on the other, means for fastening said tubes and bars together rigidly in any adjusted position.

4. A weather strip adapted to be placed at the bottom of a door comprising a stationary horizontal bar and a moving horizontal bar mounted on the stationary bar, said moving bar being composed of two sections overlapping each other and capable of being adjusted lengthwise one on the other, and capable of being rigidly fastened together in any adjusted position, one of said moving bars having a tube of small diameter formed on the upper edge thereof and the other of said moving bars having a tube of larger diameter formed on the upper edge thereof that is adapted to receive in it the tube of small diameter, said bars with their tubes being adapted to slide one on the other, means for fastening said tubes and bars together rigidly in any adjusted position, said small tube being cut away to form a wedge shape recess, a wedge shape dog located in said recess, means for moving said dog in said recess to clamp the inner tube in the outer tube and thus fasten the bars together.

5. A weather strip adapted to be placed at the bottom of a door comprising a stationary horizontal bar and a moving horizontal bar mounted on the stationary bar, said moving bar being composed of two sections overlapping each other and capable of being adjusted lengthwise one on the other, and capable of being rigidly fastened together in any adjusted position, one of said moving bars having a tube of small diameter formed on the upper edge thereof, and the other of said moving bars having a tube of larger diameter formed on the upper edge thereof that is adapted to receive in it the tube of small diameter, said bars with their tubes being adapted to slide one on the other, means for fastening said tubes and bars together rigidly in any adjusted position, said small tube being cut away to form a wedge shape recess, a wedge shape dog located in said recess, a rod extending through the small tube from one end thereof and making threaded engagement with said dog by which the dog is moved to clamp the tubes and the bars together.

6. A weather strip adapted to be placed at the bottom of a door comprising a stationary horizontal bar and a moving horizontal bar, a series of lugs struck up in the moving bar, a rubber strip inserted between the lugs and the bar, said lugs being adapted to be bent down on the rubber strip to clamp the rubber strip between the bar and the lugs.

7. A weather strip adapted to be placed at the bottom of a door comprising a stationary horizontal bar and a moving horizontal bar mounted on the stationary bar, said moving bar having a tube formed on the upper edge thereof, a plug fastened in said tube at a suitable distance from the end thereof, a plunger projecting from the end of the tube, and a compression spring placed between said plunger and said plug, said spring being adapted to force the plunger outwardly from the end of the tube.

BELLE E. WILSON,
*Administratrix of the Estate of Fred C. Wilson, Deceased.*